UNITED STATES PATENT OFFICE.

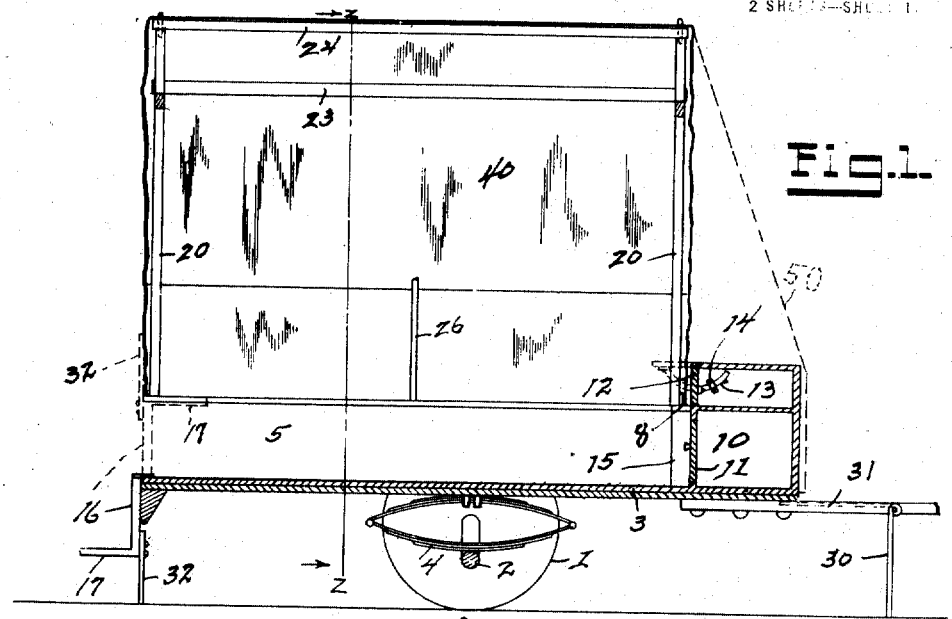
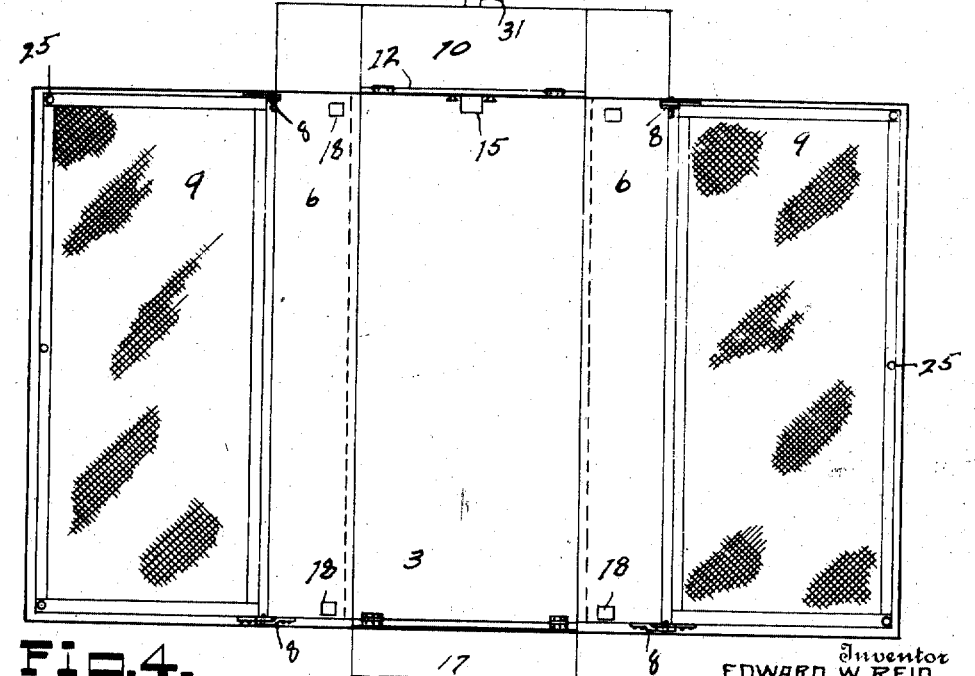

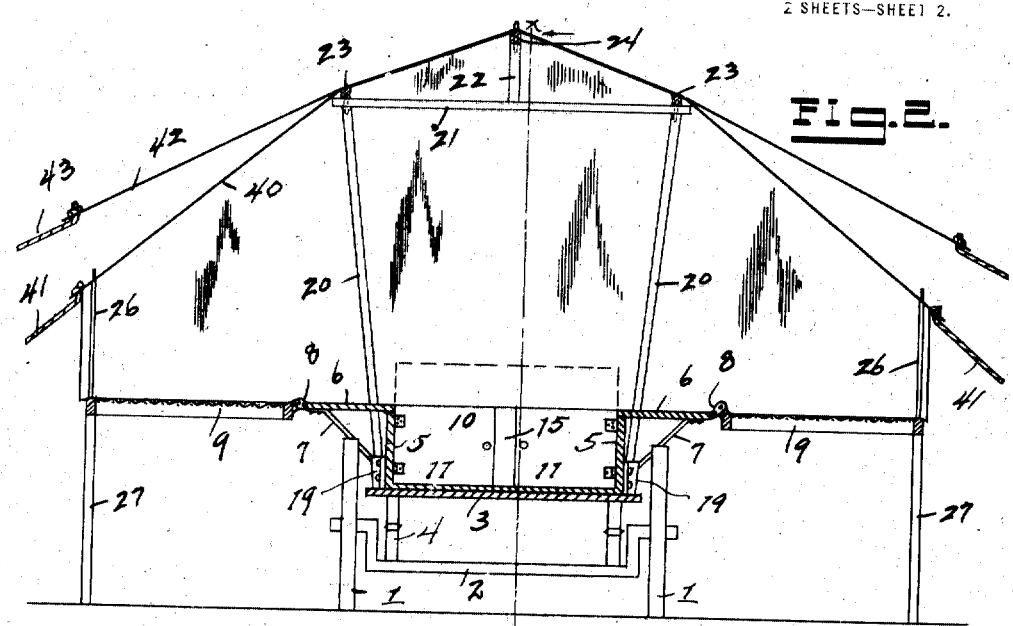

EDWARD W. REID, OF DETROIT, MICHIGAN.

CAMPING-WAGON.

1,280,840.  Specification of Letters Patent.  Patented Oct. 8, 1918.

Application filed February 19, 1916. Serial No. 79,230.

*To all whom it may concern:*

Be it known that I, EDWARD W. REID, a citizen of the United States, residing at Detroit, county of Wayne, State of Michigan, have invented a certain new and useful Improvement in Camping-Wagons, and declare the following to be a full, clear, and exact description of the same, such as will enable others skilled in the art to which it pertains to make and use the same, reference being had to the accompanying drawings, which form a part of this specification.

This invention relates to camping wagons or the like and its object is to provide a vehicle adapted to be used as a trailer for an automobile and that may be readily set up as a tent to provide a sleeping or eating compartment as readily as an ordinary tent of like capacity, and the invention further consists in the arrangement of a wagon body and a framework that may be readily taken down and stored in the wagon body. A further object of the invention is to provide a knock-down tent construction in combination with a wagon-body adapted to detachably support the same, and a pair of beds in hinged relation with the body adapted to be folded thereover when not in use, and to be folded outwardly therefrom when in use, and adapted to support the tent walls on each side. When thus outwardly supported the body of the wagon provides an aisle-way between the beds providing ample space for ingress and egress. Another object of the invention is to provide a vehicle of the character stated having a body of a form adapted for the purpose of storing the several detachable parts and further provided with a cupboard arrangement at one end thereof for the storage of cooking utensils and the like. The length of the body from the cupboard to the outward end of the wagon is sufficient to receive the poles used in erecting the tent. These and other objects and several novel features of the invention are hereinafter more fully described and claimed and shown in the accompanying drawing in which—

Figure 1 is a longitudinal section of a camping wagon embodying my invention taken on line *x—x* of Fig. 2.

Fig. 2 is a cross-section taken on line *z—z* of Fig. 1, showing the parts as assembled for use as a tent.

Fig. 3 is a similar section showing the parts folded and ored for transportation.

Fig. 4 is a plan view of the wagon body showing the bed arrangement.

Fig. 5 is a front view of the cupboard.

Fig. 6 is a cross-section thereof on line *y—y*.

Similar characters refer to similar parts throughout the drawing and specification.

The running gear for the wagon may be of any approved type but I preferably employ a single pair of wheels 1 on the axle 2 on which the body 3 is supported by springs 4 of the usual type. As indicated in cross-section in Fig. 2, the box or body 3 is provided with the upright side members 5, 5, and seat-boards 6, 6 are provided at the upper edge thereof running longitudinally of the box. These seat members are supported by the brackets 7, several of which are provided on each side. At each end, as is indicated in Figs. 2, 3 and 4, the seat-boards 6 are provided with hinge members 8, to which the side of the adjacent bed 9 is hingedly secured in each instance. These bed frames are foldable over the wagon body when in use, and the hinged bed frame on the right hand side of the drawing in Fig. 2 or 3, is higher than that on the opposite side in order that one frame may fold over the other. The bed frames and seat-boards are about six feet in length while the wagon body is somewhat longer providing a space for a cupboard 10 at the front of the vehicle, which is preferably formed with an upper and a lower compartment. The lower compartment is provided with doors 11 and the upper compartment is provided with a door 12 hinged to swing on a horizontal axis and provided with latch-members 13 so that when the door 12 is opened the latch members each engage a holder 14 provided therefor. The latch members and holders maintain the door 12 in a horizontal position as indicated in Fig. 6, which in conjunction with the top of the cupboard provides a table. A standard 15 is provided centrally of the cupboard at the front end, as indicated more clearly in Fig. 4, for the purpose hereinafter stated. As shown in Fig. 1, the box is provided with a tail board 16 having a portion 17 extending at a right angle therefrom providing a step when the end board is turned to position as shown in full lines in Fig. 1, and which may be folded up to the position shown by dotted lines in the said figure to close the end of the wagon box. This tail board, when in closed position, forms a support for one end of the lower bed frame, the opposite end of which is supported on the upright 15 above mentioned on the cupboard. The free sides of the two bed frames are thus supported when folded, and also when in such folded relation form a cover for the wagon box in which may be placed the canvas for the tent and the poles used in erection thereof.

Near the front and rear ends, the seat boards 6 are provided with apertures 18, preferably rectangular in form, and beneath these apertures and attached to the side of the wagon body near each end and on each side are sockets 19. The poles 20 for supporting the tent are inserted through these apertures 18 into the sockets 19 and are thereby held securely. The upper ends of these poles 20 are provided with pins, as with the usual tent pole, and between each two front and two rear poles 20 on opposite sides of the box is a strut member 21 apertured to receive the pole pins. An upright 22 is provided at the center of this strut member as indicated in Fig. 2. Horizontal members 23 extend longitudinally of the wagon body between two side poles 20 on each side of the vehicle, and a ridge pole 24 is provided extending between the two uprights 21 of the struts at the front and back.

The outer side frame of each bed when extended as shown in Fig. 4, is provided with apertures 25 adapted to receive short side poles or wall supports 26, the ends of which are insertible in the apertures and through an eye in the tent or cover at the upper end. The lower side of these outer side frames of the bed are also apertured at each outer corner of the bed to receive a pin in the ends of a supporting rod 27 as may be understood particularly from Fig. 2, which rods support the bed frames in horizontal position.

To prevent the wagon body from oscillating on the axle of the truck when detached from the propelling vehicle, a support 30 may be used on the trailer tongue 31 and the step member 16 may be provided with one or more standards 32 and thus the vehicle be prevented from oscillation when in use.

With the framework set up as indicated a canvas cover 40 may be stretched over the longitudinal members 23 and 24, the canvas being provided with eyes, at least, at the center to engage over pins carried at each end of the longitudinal member 24 as is usual in tent construction. The canvas near the wall may also be provided with an eye through which the upper end of the rods 26 may extend, and a flap is provided at the edge to which ropes 41 may be secured to stretch the canvas tightly in place, the other ends of the ropes (not here shown) being secured to an ordinary tent peg in the ground. A fly member 42 may also be provided extending over the tent portion 40, which may also be guided by ropes 43.

In Fig. 1, I have shown the tent structure as extending only to the cupboard 10 in front, but by arranging for the forward frames 20 to be set at the forward edge of the cupboard, the tent may be made to cover the entire box. The end wall of the tent cover may also be formed to extend over the cupboard as may be understood from the dotted lines 50 in Fig. 1. The tent is to be understood as being provided with the usual end walls open at the back of the vehicle which forms the front of the tent when erected. The end board 16 turns downward providing a step as before stated to enable the tent to be readily entered and, with the beds extended as shown in Fig. 2, the open wagon body provides an aisle-way between the beds giving free access to the cupboard at the front and seat boards 6 on which the occupants may sit. The beds 9 being secured by the hinges on one side and supported by the poles 27 at the outer edge are securely held, and the whole forms a unique sleeping compartment shielding the occupants from inclement weather, one that is readily available for use as an eating or sleeping compartment and that may be readily taken down and stored for transportation in the supporting vehicle. In storing the parts for transportation the several poles 20, 21, 23, 24, 26 and 27 are placed in the bottom of the box. The bedding may then be placed on top of these and also the canvas tent covering folded and stored after which the bed frames 9 are folded thereover the end board being folded to upright position as shown by dotted lines in Fig. 1, making a compact and not unsightly vehicle for use as a trailer. The fly 42 may be used as a cover over the top of the bed frames practically covering the entire body of the vehicle.

By this arrangement of the several parts, the erection of the device for use as a tent is as simple as with the usual tent construction. Furthermore the search for a suitable place on which to erect a tent is avoided, and as the beds are a considerable distance above the ground, the occupants are not discommoded by the condition of the ground or the dampness thereof, and thus the labor of preparing a camping place is reduced to a minimum.

Having thus briefly described my invention, its utility and construction, what I claim and desire to secure by Letters Patent of the United States is—

1. A camping wagon comprising a wagon box having horizontal seat board extending longitudinally thereof above the bottom of the box, a bed frame hingedly secured to the outer edge of each seat board adapted to be extended in a horizontal plane therewith or folded over the box, means for supporting the bed frames when in the extended relation, a knock-down framework comprising poles adapted to be detachably secured to the wagon box and to the bed frames in a vertical position, horizontal members extending between said poles longitudinally of the wagon box, and a canvas covering of tent like form adapted to be stretched over the framework thus provided.

2. A camping wagon comprising an open box having horizontal side members providing seats extending longitudinally thereof above the bottom of the box, a bed frame hingedly secured along one edge to the outer edge of each side member and adapted to be folded thereover and over the box or turned to extended relation in a plane with the respective side member, supports for the free sides of the frames when extended consisting of posts detachably secured to the lower side thereof, a series of vertically positioned poles detachably mounted on the box and on the bed frames, the open box providing an aisle way between the beds when extended, and a receptacle for poles and the like when the bed frames are folded thereover, and a canvas covering of tent like form adapted to be stretched over the poles when erected.

3. A camping wagon comprising a wagon box, a bed frame pivotally secured to each longitudinal side thereof above the bottom of the box and adapted to be folded thereover and one over the other providing with the box a receptacle for material, supports for the said frames when in extended relation, vertical side and end poles adapted to be detachably secured to the outer edge of the bed frames and to the wagon box on the upper side, horizontal members extending longitudinally of the box between the vertical end poles providing therewith a knock-down skeleton frame, and a canvas cover adapted to be stretched thereover.

4. A camping wagon comprising an open wagon box, a hinged end gate therefor of a form to provide a step for entering the wagon when in open position, a cupboard at the forward end of the box extending substantially the full width thereof, seat boards above the bottom of the wagon box and extending longitudinally at each side thereof terminating at the cupboard, a bed frame hingedly secured to the outer edge of each seat board adapted to fold over the box back of the cupboard or to a horizontal plane with the seat board, detachable supporting poles for supporting the free edge of the bed frames from the ground, a skeleton framework for erection on the box and the upper side of the bed frames, a support at the rear of the cupboard for supporting one end of the bed frames when folded over the box, the said end gate and step arrangement providing a support for the opposite end of the bed frames when folded, and a tent like cover for the framework.

5. A camping wagon comprising a wagon box, seat boards extending outwardly therefrom on each side, a bed frame hingedly secured to each seat board adapted to be folded thereover and one over the other, supports for the outer edges of the bed frames when extended, the seat boards having an aperture near each end thereof, a pole socket on the box beneath each aperture, poles adapted to be inserted through the apertures and in the sockets, a strut member extending between each pair of directly opposite poles, horizontal members extending longitudinally of the wagon each connecting the series of poles on one side of the wagon box, a ridge pole extending longitudinally between the strut members, wall poles adapted for insertion in sockets on the upper side of each outer longitudinal side member of the bed frames, and a canvas cover adapted to be stretched over the framework and wall poles.

6. A camping wagon adapted for use as a trailer comprising a single two-wheeled truck, a wagon body mounted thereon, an end gate hingedly secured thereto providing a step when in open position, a standard on said step adapted to contact the ground, a trailer tongue, a standard or support thereon also adapted to contact the ground, the two ground contacts preventing oscillation of the body about the axle, a knock-down framework for the body, and a tent covering for said framework.

In testimony whereof, I sign this specification.

EDWARD W. REID.